United States Patent [19]
Pulhamus, Jr. et al.

[11] Patent Number: 5,646,832
[45] Date of Patent: Jul. 8, 1997

[54] POWER FACTOR CORRECTED SWITCHING POWER SUPPLY

[75] Inventors: William R. Pulhamus, Jr., Bloomfield; Rajiv K. Baphna, Rochester, both of N.Y.

[73] Assignee: Harris Corporation, Melbourne, Fla.

[21] Appl. No.: 266,692

[22] Filed: Jun. 28, 1994

[51] Int. Cl.⁶ ................................................ H02M 3/335
[52] U.S. Cl. .............................................. 363/24; 363/133
[58] Field of Search ................................... 363/16, 24, 25, 363/133, 134

[56] References Cited

U.S. PATENT DOCUMENTS

| | | |
|---|---|---|
| 4,685,039 | 8/1987 | Inou et al. ................. 363/16 |
| 4,754,385 | 6/1988 | McDade et al. ............. 363/16 |
| 5,225,767 | 7/1993 | Gulczynski ................. 363/71 |

*Primary Examiner*—Peter S. Wong
*Assistant Examiner*—Y. J. Han
*Attorney, Agent, or Firm*—Rogers & Killeen

[57] ABSTRACT

In an AC to DC power converter (off line switcher) and a method of converting AC power to DC power in high voltage systems the flyback converter's low side semiconductor switch has a lower breakdown voltage than its high side semiconductor switch. The lower breakdown voltage is achievable by means of a shunt regulator that controls a clamp voltage across the low side switch. The efficiency of the converter's post regulator is improved by processing only a fraction of the system's total power output.

20 Claims, 6 Drawing Sheets

POWER FACTOR CORRECTED SWITCHING POWER SUPPLY

BACKGROUND OF THE INVENTION

The present invention relates to DC power supplies, and more particularly to an AC to DC power converter in which the efficiency of the power supply is improved by providing a flyback converter with one semiconductor switch with a lower breakdown voltage than its other semiconductor switch, and by reducing the amount of power processed by the post regulator.

DC power supplies may convert an AC voltage, such as found in utility company power lines, to a DC voltage, and in this role are known as off line switchers (or off line converters). For example, an off line switcher may produce a low voltage regulated output, such as 50 volts DC, from an AC power line voltage, such as 166 to 576 volts RMS.

The power factor is a ratio of real input power (watts) to apparent input power (volt-amperes), and is a measure of power service utilization; it is desirably as close to unity as possible. Traditional methods of improving the power factor are generally not applicable to off line switchers because the current drawn by off line switchers is not sinusoidal. Typically, off line switchers draw the input current in short pulses of high peak value, and the power factor may be increased by chopping the line current at a frequency that is high relative to the input AC frequency. Waveforms of appropriate magnitude and shape may be created by storing energy in the primary windings of a transformer and delivering the energy to the load from the secondary windings, such as by using an electronically controlled flyback converter.

With reference to FIG. 1, a power factor corrected off line switcher 10 may include a rectifier 12 for producing a full wave rectified waveform from an AC input. The rectified waveform is provided to a flyback converter 14 for producing an intermediate DC voltage V1 of a predetermined magnitude (for example, with inputs of 120/240 volts, an intermediate voltage may be 400 volts). The DC voltage is provided to a DC-DC converter 16 that processes all of the output power to produce the desired output voltage V2 (in this example, 50 volts). Control circuitry 18 provides a means for feeding back current and voltage to the flyback converter 14 to enable regulation of the DC output and control of the power factor.

The flyback converter 14 may include a transformer that is operated at a very high frequency relative to the frequency of the AC input. The transformer is operated by means of switches, that may be semiconductor devices, connected to the input and output of the transformer that are turned on and off at the requisite frequency. However, when the rectified AC voltage that varies from zero to a peak rectified AC voltage is applied to the transformer as a series of high frequency pulses, energy stored in the leakage reactance and other parasitic reactances may cause high voltages to appear across the switches during the transition to the off state. When the switches are semiconductor devices, these high voltages may exceed the breakdown voltage of the devices and destroy the switches. Thus, additional protection for the switches must also be provided. For example, with reference to FIG. 2 that illustrates a flyback converter 20 of the prior art, operation of a transformer 22 may be controlled by semiconductor switches 24 and 26 that provide energy for storage in inductor 28. In this example, diode voltage clamps 30 and 32 have been provided to prevent the high voltages from destroying the switches 24 and 26. See, U.S. Pat. No. 5,146,396 issued to Eng, et al. Sep. 8, 1992.

The semiconductor switches used in a flyback converter as in the prior art need to withstand the applied supply voltage plus the additional voltage imposed on the transient sink capacitor 132 plus a safety margin. Using the prior art of FIG. 2 as an example, if the circuit is operated on 480 volts RMS the transistors need to withstand the peak voltage (480 √2) 679 volts plus 100 to 200 volts that results from energy being stored in capacitor 132 for a total of 879 volts plus a safety margin. Both semiconductor devices having a breakdown voltage of 879 volts plus a safety factor need to be provided. In many AC to DC converters, especially high frequency converters, the switches are desirably MOSFETs.

The efficiency of semiconductor switches, and especially MOSFETs, improves as the breakdown voltage decreases. As is known, MOSFETs with lower breakdown voltages have a lower on-state resistance, resulting in improved efficiency. Thus, the efficiency of off line switchers may be improved by reducing the voltage capability of the switches in the flyback converter.

The DC-DC converters of prior art power converters process 100% of the power supply's output power. For example, when V1 is 400 volts, the DC-DC converter receives an input of 400 volts and converts it to an output of 50 volts. Processing all of the output power introduces inefficiencies that could not be resolved so long as all of the power was processed.

Accordingly, it is an object of the present invention to provide a novel DC power supply and a novel method of converting power that obviate the problems of the prior art.

It is another object of the present invention to provide a novel DC power supply and method of converting power in which one of the semiconductor switches in the flyback converter has a lower breakdown voltage than the other semiconductor switch.

It is yet another object of the present invention to provide a novel DC power supply and method of converting power in which one switch in the flyback converter has a breakdown voltage less than a peak rectified AC voltage, and the other switch has a breakdown voltage equal to or greater than the peak rectified AC voltage.

It is still another object of the present invention to provide a novel DC power supply and method of converting power in which one switch in the flyback converter is clamped to a voltage set by a constant voltage shunt regulator.

It is a further object of the present invention to provide a novel DC power supply and method of converting power in which one switch in the flyback converter is clamped to a voltage set by a voltage shunt regulator with a clamp voltage that is greater than the product of an output voltage of the transformer times a turns ratio of the transformer and less than the peak rectified AC voltage.

It is yet a further object of the present invention to provide a novel DC power supply and method of converting power in which the post regulator processes a fraction of the converter output power.

These and many other objects and advantages of the present invention will be readily apparent to one skilled in the art to which the invention pertains from a perusal of the claims, the appended drawings, and the following detailed description of preferred embodiments.

DESCRIPTION OF PREFERRED EMBODIMENTS

Figure 3:
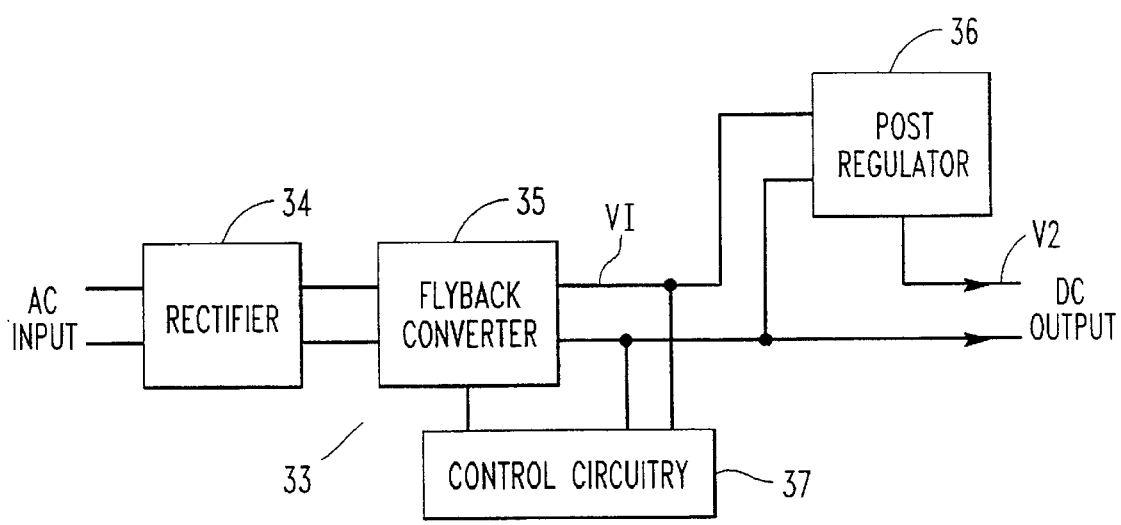
FIG. 3 is a block diagram of an embodiment of a DC power supply of the present invention.

With reference now to FIG. 3, an embodiment 33 of the improved DC power supply of the present invention may include a rectifier 34 for producing a full wave rectified waveform from an AC input. The rectified waveform is provided to a flyback converter 35 for producing an intermediate DC voltage V1 of a predetermined magnitude less than or greater than the desired output voltage (for example, 90% of the output voltage). A post regulator 36 increases the intermediate voltage V1 to the desired output voltage V2 by adding the voltage needed in series with the output of the flyback converter 35. For example, if the desired output voltage V2 is 50 volts, V1 may be 45 volts and post regulator 36 may add 5 volts. Control circuitry 37 provides a means for feeding back current and voltage to the flyback converter 35 to enable regulation of the DC output and control of the power factor.

The flyback converter 35 may include two semiconductor switches that do not need to have the same breakdown voltage. That is, one of the switches may have a significantly lower breakdown voltage to thereby increase the efficiency of the converter. The switch with the lower breakdown voltage may be used because the switch is clamped to a lower voltage than the peak rectified AC voltage. The clamped voltage may be regulated by a shunt regulator.

Figure 4:
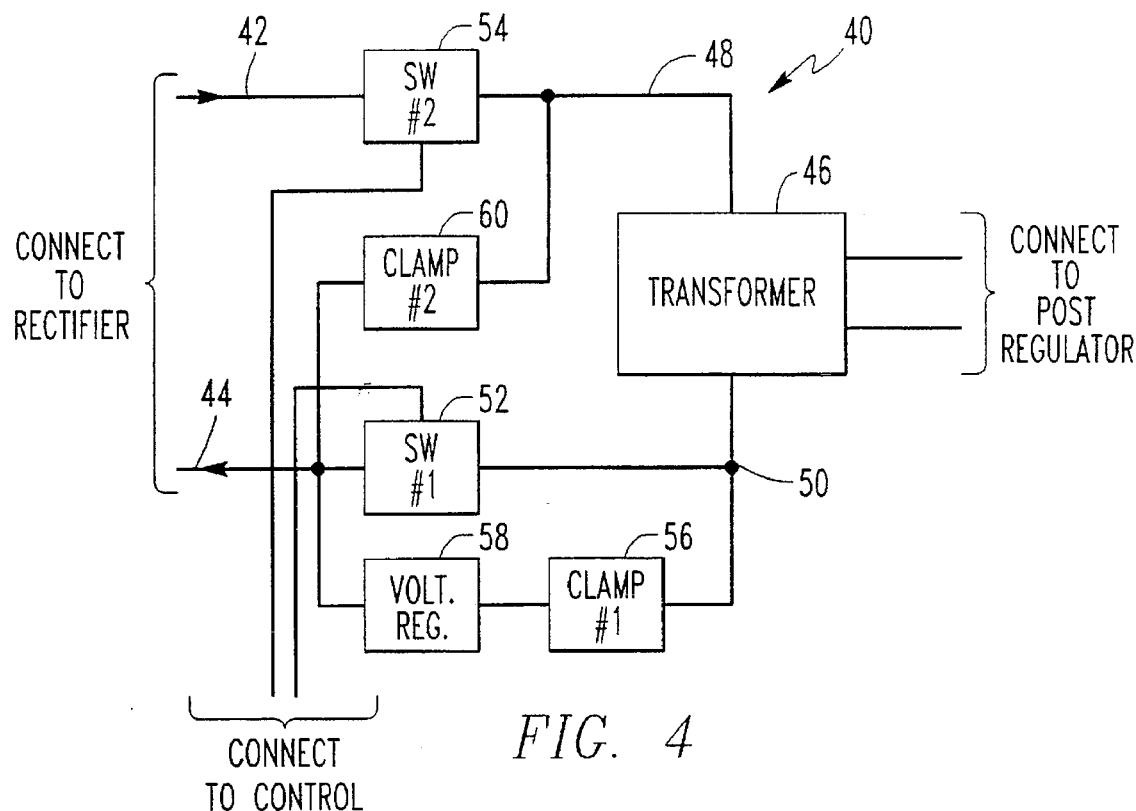
FIG. 4 is a block diagram of an embodiment of a flyback converter of the present invention.

With reference now to FIG. 4, a flyback converter 40 may have an input connection 42 for receiving a rectified AC voltage from a rectifier and a common rail 44 that provides connections for rectifier negative and a voltage regulator return (discussed below). The rectified AC voltage is provided to a transformer 46 that has a primary winding connected between nodes 48 and 50 and a secondary winding connected to a post regulator through appropriate connecting circuitry, such as the rectifier and capacitor discussed below. The voltage between nodes 48 and 50 may be as high as the peak rectified AC voltage, and the voltage between node 50 and common rail 44 may be as high as the voltage reflected to the primary winding (the transformer output voltage times the transformer turns ratio) plus the voltage generated by the energy stored in the transformer leakage reactance and other circuit strays. The transformer 46 has an appropriate turns ratio for providing the desired DC voltage across the secondary winding.

The flyback converter 40 may be provided with two semiconductor switches for operating the transformer under the control of appropriate control circuitry. A first switch 52 selectively connects the node 50 to the common rail 44, and second switch 54 selectively connects the node 48 to the input connection 42. Each switch is clamped for protection from high voltage transients that may appear at the nodes 48 and 50. The first switch 52 is clamped with clamp 56 to a voltage greater than the reflected voltage and less than the peak input voltage. A voltage regulator 58 may be provided to regulate the clamp voltage. The second switch 54 is clamped with clamp 60 to a voltage equal to the peak voltage on the common rail 44. The first switch 52 may have a lower breakdown voltage than the second switch 54 because the voltage across the switch is clamped to a lower voltage (accordingly, the first switch 52 and components associated therewith may be denominated "low-side", and the second switch 54 and its associated components "high-side"). The components in the flyback converter 40 may be conventional.

Figure 5:
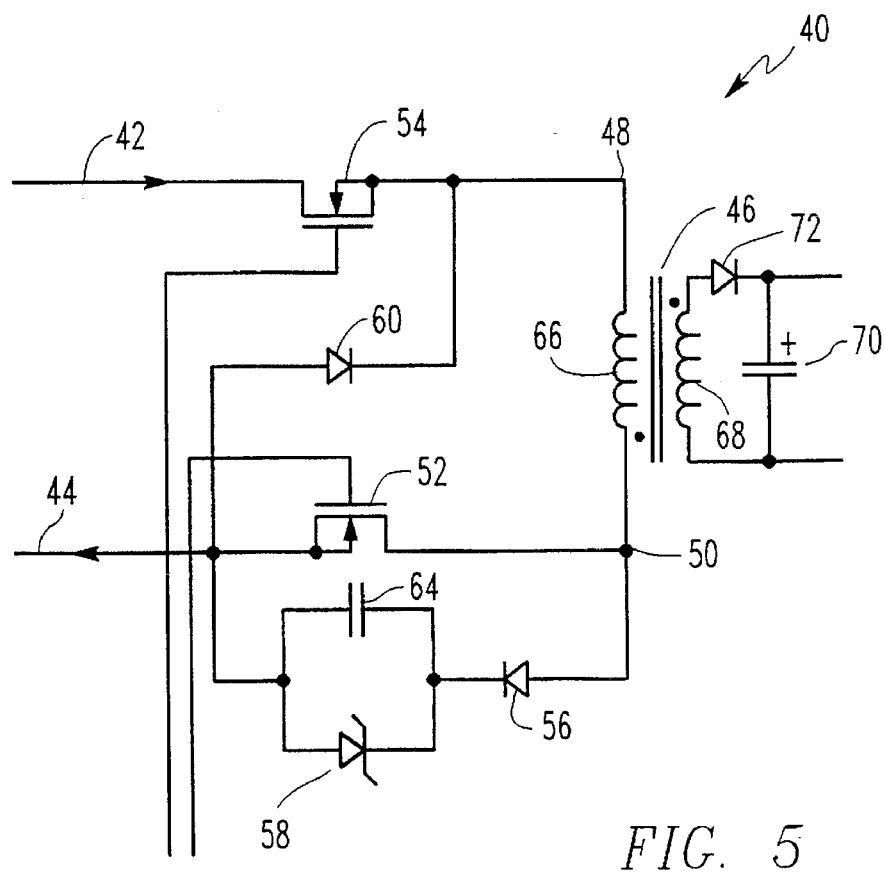
FIG. 5 is a circuit diagram illustrating components that may be used in the embodiment of FIG. 4.

An exemplary embodiment of the flyback converter 40 may be seen in FIG. 5 in which the same numerical designations as in FIG. 4 have been used on similar components in the interest of clarity. The switches 52 and 54 may be MOSFETs having source and drain switch terminals and gates connected to the control circuitry. The clamps 56 and 60 may be diodes connected as shown. The voltage regulator 58 may be a constant voltage shunt regulator (for example, a Zener diode) or a series pass regulator (not shown) and may be connected in parallel with a snubber capacitor 64. The transformer 46 may include a primary winding 66 and an isolated secondary winding 68. An energy storing capacitor 70 and output rectifier 72 may be provided at the transformer output.

In operation, the incoming line voltage is rectified and provided to the flyback converter. Switches 52 and 54 are turned "on" (conducting) and "off" (not conducting) at the same time to selectively direct the incoming line voltage across the primary winding 66. The switch frequency ("on" and "off") is desirably high compared to the AC input; e.g., 100 KHz for a 120 Hz input). While the switches are "on", the current goes through switch 54 and builds up in the primary winding 66. While the switches are "off", the voltage across the secondary winding 68 reverses with the current continuing to flow. Since the windings 66 and 68 are mutually coupled, the storage capacitor 70 receives a current equal to the current in the primary winding 66 times the turns ratio when the voltage exceeds the output voltage plus the forward drop of the output rectifier 72. At the same time as the voltage reverses in the secondary winding 68, the voltage reverses in the primary winding 66.

The high side clamp 60 sets the lower limit for the voltage potential across the switch 54 by preventing the voltage on the drain of the high side switch 54 from going below the voltage of the common rail. Thus, the clamp 60 ensures that the switch 54 is subjected to no more than the supply voltage.

The low side clamp 56 conducts when the voltage at the drain of the low side switch 52 exceeds the clamp voltage of the shunt regulator 58 across the snubber capacitor 64. The clamp voltage of the shunt regulator 58 is set above the output voltage times the transformer turns ratio. Energy is delivered from the clamp 56 as a pulse train at the switching frequency, with the current of the pulses being limited to the operating current of the power supply. The current pulses from the clamp 56 are stored in capacitor 64 that stores the energy while limiting the rate of rise of the voltage across the capacitor. Shunt regulator 58 sinks current (e.g., to ground) from the capacitor 64 and dissipates it to maintain the voltage across the capacitor at a predetermined maximum. The shunt regulator 58 draws a steady current from the capacitor 64 that is approximately equal to the average value of the applied current pulse train.

The switch 52 may have a lower breakdown voltage because it is subjected to the lower clamped voltage, rather than the peak supply voltage. As the lower breakdown voltage causes the on-state resistance of the switch 52 to be reduced, the efficiency of the DC power supply is improved.

Figure 6:
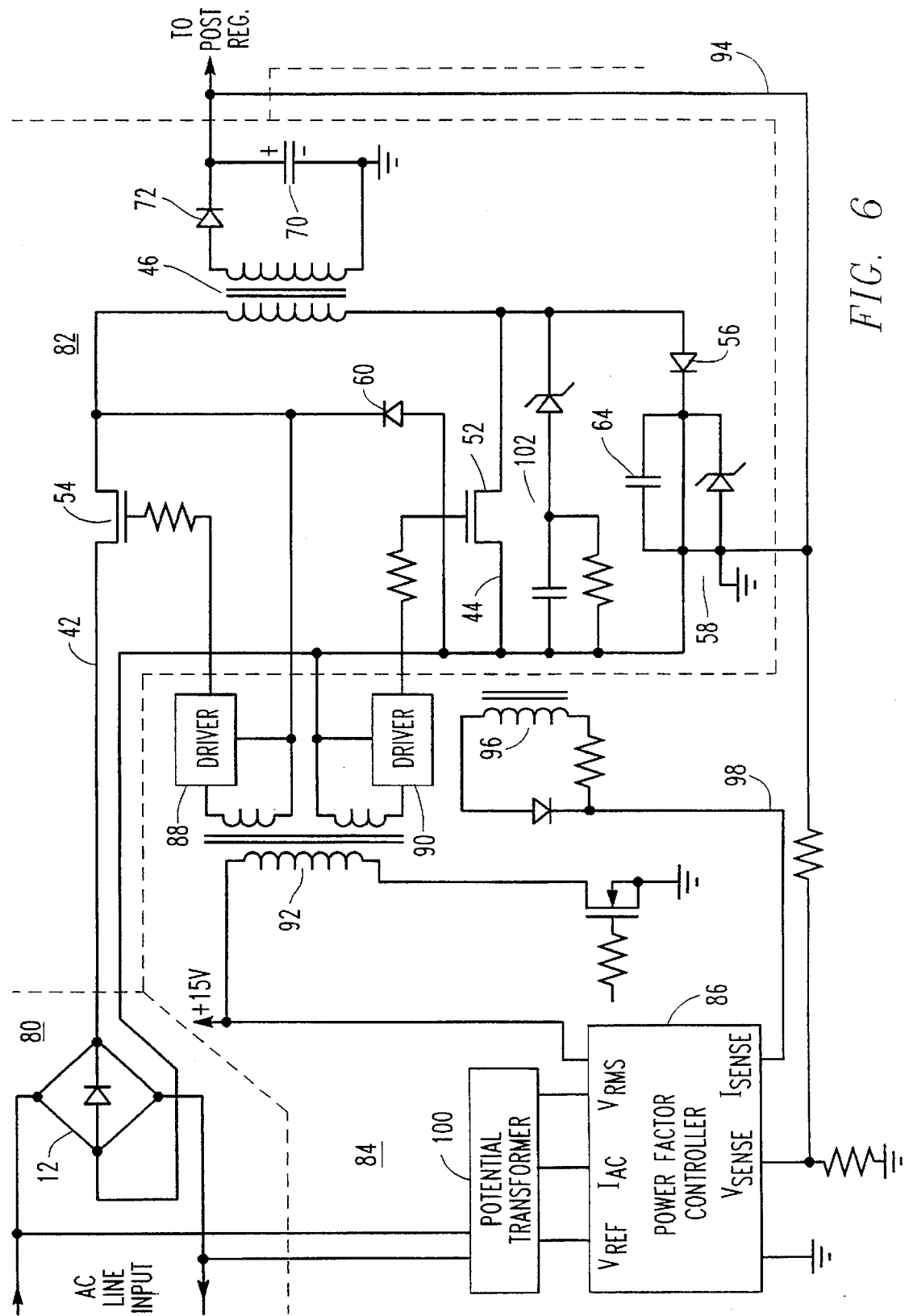
FIG. 6 is a circuit diagram of an embodiment of a rectifier, flyback converter, and control circuitry of the present invention.
Figure 7:
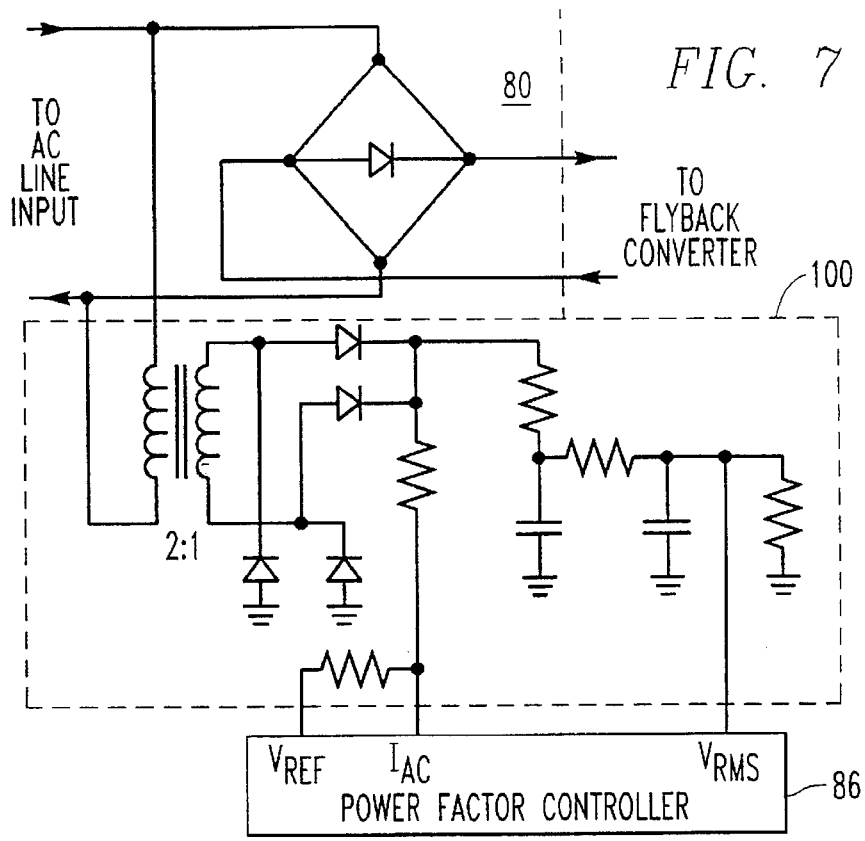
FIG. 7 is a circuit diagram of a potential transformer that may be used in the control circuitry of FIG. 6.
Figure 8:
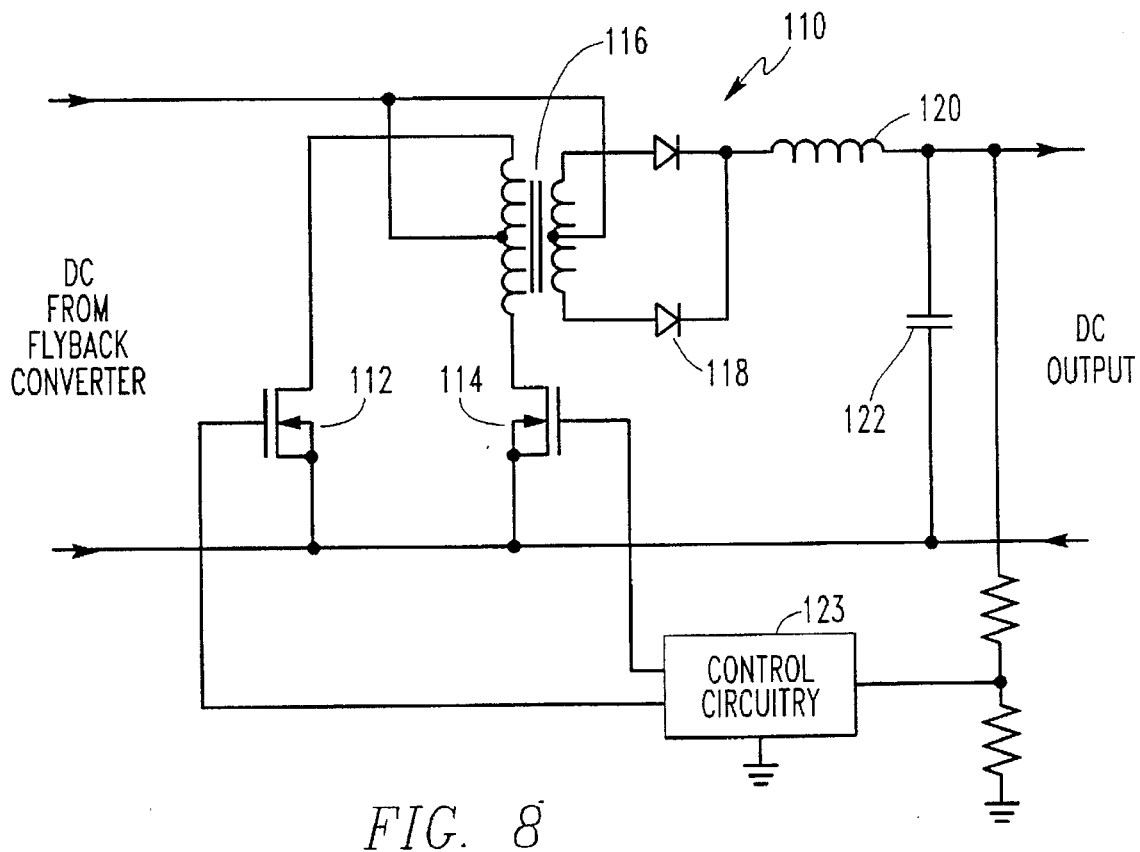
FIG. 8 is a circuit diagram of an embodiment of a post regulator of the present invention.

A preferred embodiment of the DC power supply is illustrated in FIGS. 6 through 8. As seen in FIG. 6, a rectifier 80 may be connected to a flyback converter 82 that is controlled by control circuitry 84. The operation of the flyback controller is described above, and numerical designations for similar components in the flyback converter 82 have been retained in the interest of clarity.

The control circuitry 84 may be ground referenced and include a conventional power factor controller 86, such as the UC2854. The power factor controller 86 may provide "on" and "off" commands to high side driver 88 and low side driver 90 through driver transformer 92 to control operation of the high and low side switches 54 and 52. The drivers 88 and 90 may be conventional (such as the HV400). The power factor controller 86 may receive voltage feedback information from the DC voltage output through line 94, and receive current feedback information from the common rail 44 through a current feedback transformer 96 and line 98. Information about the AC line input is obtained through potential transformer 100 shown in more detail in FIG. 7. A snubber network 102 may be provided to reduce the ringing at the edges of the switching waveform.

The control circuitry 84 is an average continuous current mode control power factor correction circuit that looks at the shape of the input voltage waveform, samples the output DC voltage, and samples the current in the switches 52 and 54. The circuitry 84 adjusts the duty cycle of the switches to maintain the output DC voltage, and to produce a line current waveform that replicates the line voltage waveform. This action allows the power factor to be near unity, and provides low harmonic distortion.

The post regulator 36 of FIG. 3 may be a boost regulator that provides an output voltage that is added to the output of the power factor regulator to achieve the desired output voltage. The output voltage may need adjustment due to constraints in the voltage control loop bandwidth, dynamic load current variations, and availability of energy storage, and the post regulator may be designed to accommodate the expected range of adjustment needed (e.g., ±10%). The post regulator may also smooth the signal from the flyback converter. For example, the flyback converter may have a relatively narrow bandwidth (e.g., 10 to 15 Hz), and transient loading and a harmonic ripple (e.g., 120 Hz) in the storage capacitor 70 may provide undesirable fluctuations in the signal that can be reduced by the post regulator.

With reference now to FIG. 8, in a preferred embodiment a post regulator 110 may be a push-pull forward converter with a step down transformer at its output to increase the DC voltage from the flyback converter to the desired magnitude. For example, if the desired DC voltage is 50 volts, the flyback converter may provide 45 volts that is increased to 50 volts in the post regulator. The post regulator 110 may include push-pull switches 112 and 114 connected to the primary winding of a step down transformer 116. The secondary winding of the transformer 116 is connected to a full wave rectifier 118 with an output filter inductor 120 and energy storing capacitor 122 at its output. Control circuitry 123 may be grounded.

The post regulator 110 has a wider bandwidth than the flyback converter and thus is able to smooth transients and the harmonic ripple. Further, since the post regulator is only handling a small percent of the supply output power (10% in the example above) the efficiency of the post regulator is increased over systems in which the entire output power of the converter is processed by the post regulator. The improved efficiency of the post regulator will increase the efficiency of the DC power supply (in the example above by three to five percent).

In an alternative embodiment, the control circuitry 84 may float, rather than be grounded (as was shown in FIG. 6). In this event, the voltage feedback provided to the power factor controller 86 through line 94 may be amplified and isolated with an opto-isolator.

Figure 1:
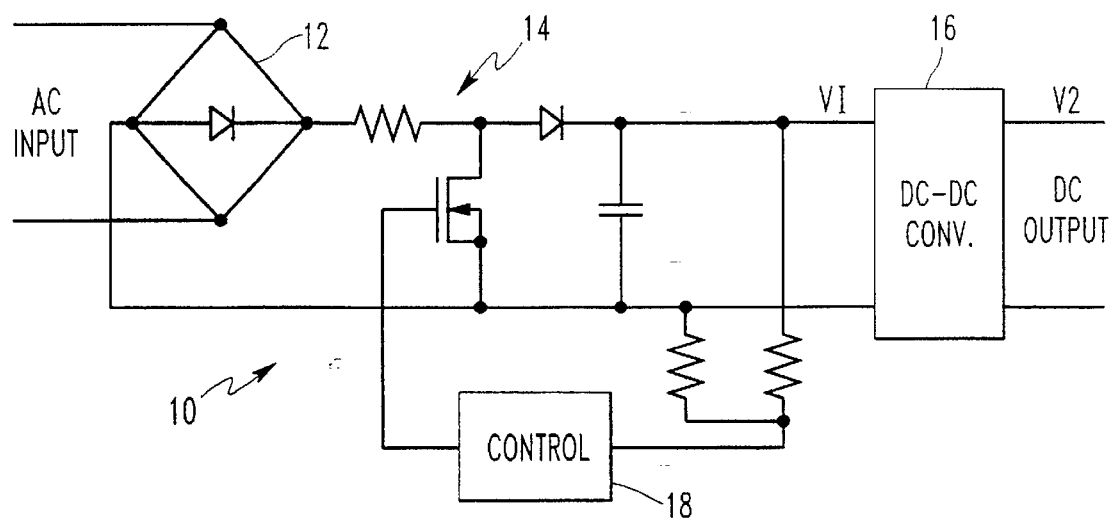
FIG. 1 is a block diagram of a DC power supply of the prior art.
Figure 2:
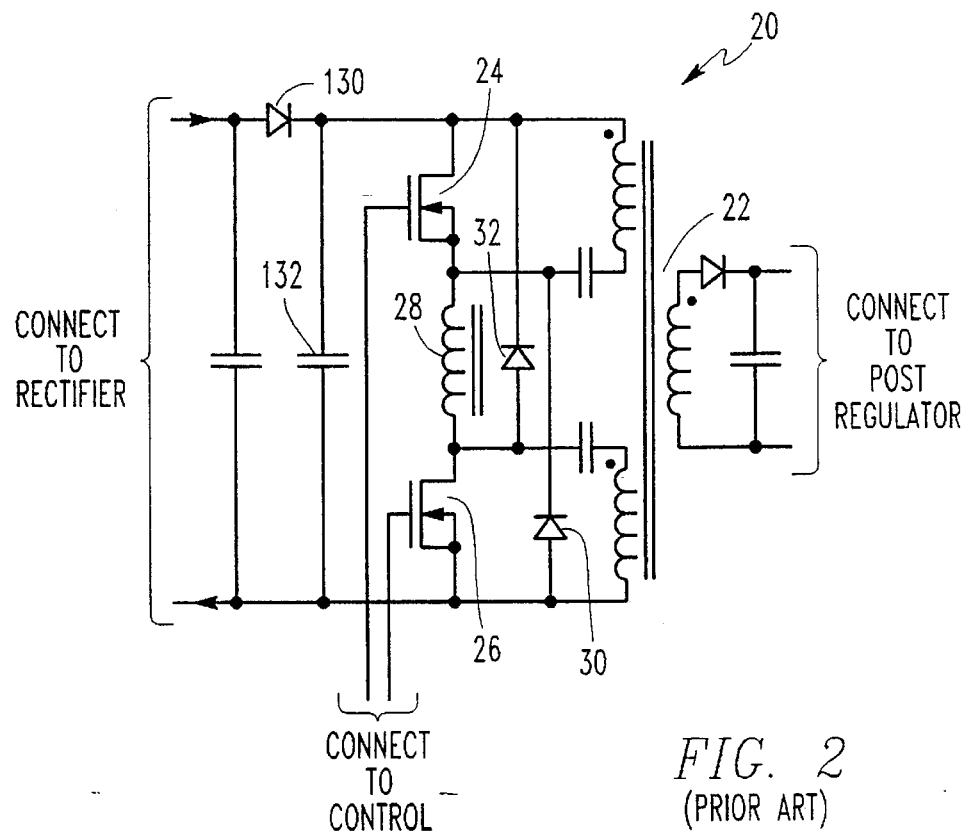
FIG. 2 is a circuit diagram of a flyback converter of the prior art.
Figure 9:
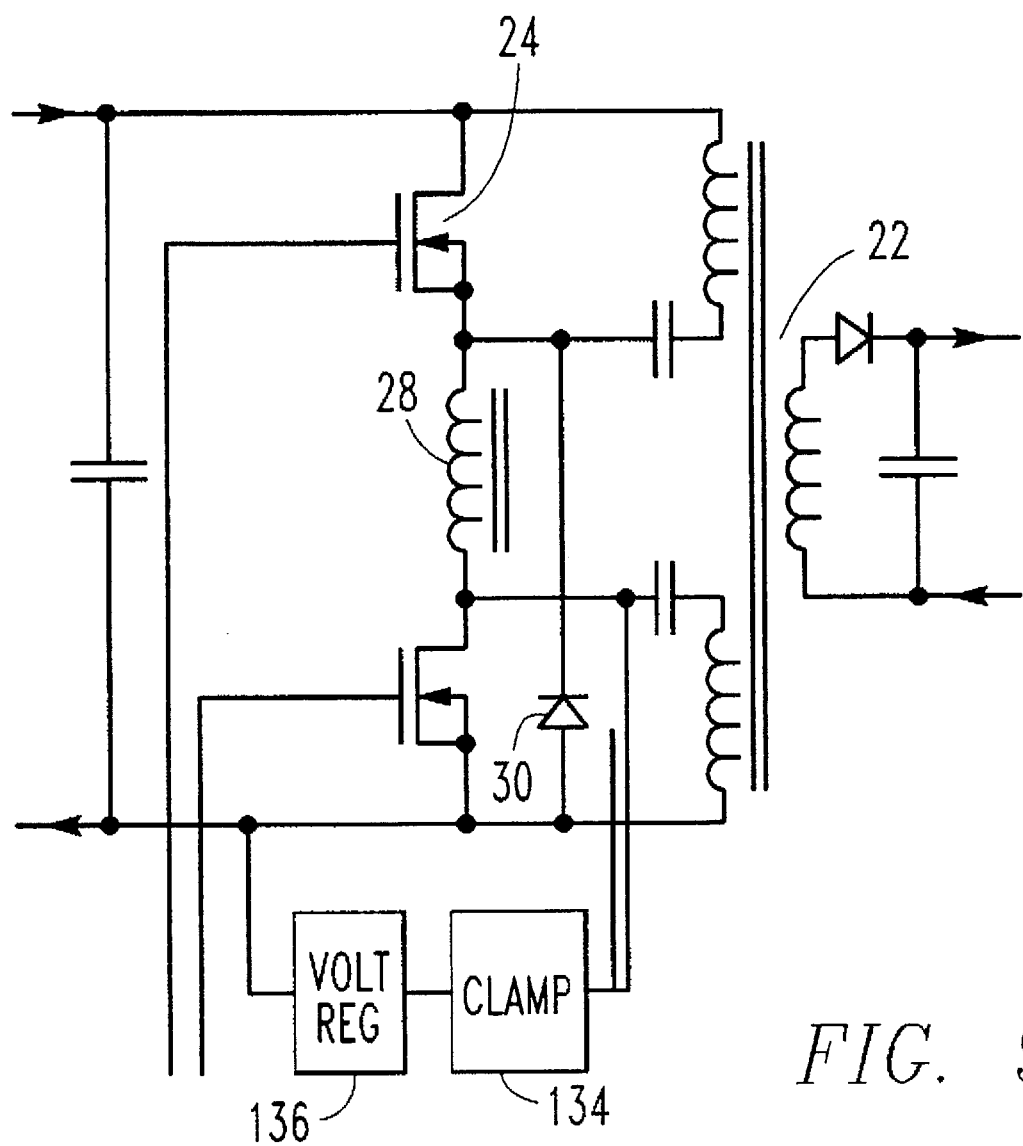
FIG. 9 is a circuit diagram of a further embodiment of the present invention.

In a further alternative embodiment and with reference to FIG. 9, the transformer 46 of FIG. 5 may be replaced with a transformer and inductor, such as shown in prior art FIG. 2. When the present invention is used to improve the prior art converter of FIG. 2, the clamp 32, the diode 130 and capacitor 132 of the prior art may be removed. A clamp 134 and voltage regulator 136 of the present invention may be provided as shown.

For three phase operation, three of the circuits above may be connected, one circuit for each phase. The outputs of the three circuits may be connected in parallel with each being capable of providing one-third of the output current, or may be connected in series with each being capable of providing one-third of the output voltage. In either parallel or series, separate post regulators could be used with each circuit, or a single post regulator may be used for the combined output.

While preferred embodiments of the present invention have been described, it is to be understood that the embodiments described are illustrative only and the scope of the invention is to be defined solely by the appended claims when accorded a full range of equivalence, many variations and modifications naturally occurring to those skilled in the art from a perusal hereof.

What is claimed is:

1. A DC power supply for converting an AC input voltage to a desired DC output voltage comprising:

rectifier means for providing a rectified AC voltage;

a flyback converter comprising:

a transformer with primary and secondary windings for providing the intermediate DC voltage across a secondary winding of the transformer; and first and second semiconductor switches connected to said primary winding for selectively providing the rectified AC voltage to the primary winding, said first switch having a breakdown voltage less than a peak rectified AC voltage, and said second switch having a breakdown voltage greater than the peak rectified AC voltage for providing an intermediate DC voltage less than or greater than the desired DC output voltage;

a post regulator for boosting the intermediate DC voltage from said flyback converter to the desired DC output voltage; and means for controlling said converter.

2. The DC power supply of claim 1 wherein said flyback converter further comprises;

a first voltage clamp for clamping a voltage across the first switch;

a second voltage clamp for clamping a voltage across the second switch; and a voltage regulator for regulating a clamp voltage of said first voltage clamp to a value greater than the product of the intermediate DC voltage times a turns ratio of the primary and secondary windings and less than a peak rectified AC voltage.

3. The DC power supply of claim 1 further comprising a first voltage clamp for clamping a voltage across said first switch, and a voltage regulator for regulating a clamp voltage of said first voltage clamp.

4. The DC power supply of claim 3 wherein said voltage regulator regulates the clamp voltage of said first voltage clamp to a value greater than the product of the intermediate DC voltage times a turns ratio of the primary and secondary windings and less than the peak rectified AC voltage.

5. A flyback converter for a DC power supply in which a rectified AC voltage is selectively provided through first and second switches to a primary winding of a transformer to provide a DC voltage across a secondary winding of the transformer, the flyback converter comprising:

a first voltage clamp for clamping a voltage across the first switch;

a second voltage clamp for clamping a voltage across the second switch; and a voltage regulator for regulating a clamp voltage of said first voltage clamp to a value greater than the product of an output voltage of the transformer times a turns ratio of the primary and secondary windings and less than a peak rectified AC voltage, whereby the maximum voltage across the first switch is less than the maximum voltage across the second switch.

6. The flyback converter of claim 5 further comprising a capacitor in parallel with said voltage regulator.

7. The flyback converter of claim 5 wherein said voltage regulator is in series with said first voltage clamp.

8. The flyback converter of claim 5 wherein the switches are semiconductor switches and wherein the first switch has a breakdown voltage less than a breakdown voltage of the second switch.

9. The flyback converter of claim 5 wherein said second voltage clamp has a clamp voltage equal to the peak rectified AC voltage.

10. A DC power supply in which a rectified AC voltage is selectively provided to a primary winding of a transformer to provide a DC voltage at a rectifier filter across a secondary winding of the transformer, the power supply comprising first and second semiconductor switches connected to the primary winding for selectively providing the rectified AC voltage to the primary winding, said first switch having a breakdown voltage less than a peak rectified AC voltage, and said second switch having a breakdown voltage greater than the peak rectified AC voltage.

11. The DC power supply of claim 11 further comprising a first voltage clamp for clamping a voltage across said first switch, and a voltage regulator for regulating a clamp voltage of said first voltage clamp.

12. The DC power supply of claim 11 wherein said voltage regulator regulates the clamp voltage of said first voltage clamp to a value greater than the product of an output voltage of the transformer times a turns ratio of the primary and secondary windings and less than the peak rectified AC voltage.

13. The DC power supply of claim 11 wherein said voltage regulator is a shunt regulator.

14. The DC power supply of claim 10 further comprising a controller for operating said first and second switches, said controller operating at ground potential.

15. The DC power supply of claim 10 further comprising a post regulator for boosting or bucking an output voltage from the secondary winding of the transformer by adding a voltage thereto.

16. The DC power supply of claim 15 wherein said post regulator comprises a push-pull forward converter with a step down transformer at its output.

17. A method of converting an AC voltage into a DC voltage in which a rectified AC voltage is selectively provided to a primary winding of a transformer to provide a DC voltage across a secondary winding of the transformer, the method comprising the steps of providing first and second semiconductor switches connected to the primary winding for selectively providing the rectified AC voltage to the primary winding, the first switch having a breakdown voltage less than a peak rectified AC voltage, and the second switch having a breakdown voltage greater than the peak rectified AC voltage.

18. The method of claim 17 further comprising the step of clamping a voltage across the first switch with a voltage regulator.

19. A method supplying a desired DC output voltage from an AC input voltage comprising the steps of:

providing a rectified AC voltage;

providing an intermediate DC voltage less than or greater than the desired DC output voltage in steps comprising:
providing a transformer with primary and secondary windings;
providing the intermediate DC voltage at a rectifier/ filter across a secondary winding of the transformer; and
connecting first and second semiconductor switches to the primary winding for selectively providing the rectified AC voltage to the primary winding,
wherein the first switch has a breakdown voltage less than a peak rectified AC voltage, and the second switch has a breakdown voltage greater than the peak rectified AC voltage; and boosting or bucking the intermediate DC voltage from said flyback converter to the desired DC output voltage.

20. The method of claim 19 further comprising the steps of:

clamping a voltage across the first switch;

clamping a voltage across the second switch; and regulating the clamped voltage across the first switch to a value greater than the product of the intermediate DC voltage times a turns ratio of the primary and secondary windings and less than a peak rectified AC voltage.

\* \* \* \* \*